United States Patent [19]
McMurtrey

[11] Patent Number: 4,635,499
[45] Date of Patent: Jan. 13, 1987

[54] BICYCLE HANDLEBAR BRACE

[75] Inventor: David K. McMurtrey, Maysville, Ky.

[73] Assignee: Wald Manufacturing Co., Inc., Maysville, Ky.

[21] Appl. No.: 753,394

[22] Filed: Jul. 10, 1985

[51] Int. Cl.⁴ ............................................. B62K 21/12
[52] U.S. Cl. .................................... 74/551.1; D12/178
[58] Field of Search ................ 74/551.1, 551.2, 551.3, 74/551.4, 551.6, 551.7; D12/178; 280/289 H

[56] References Cited
U.S. PATENT DOCUMENTS

| D. 3,535 | 6/1869 | Pratt . | |
|---|---|---|---|
| D. 52,150 | 7/1918 | Schwinn . | |
| D. 58,224 | 6/1921 | Green . | |
| D. 166,693 | 5/1952 | Lines . | |
| D. 211,441 | 6/1968 | Steller . | |
| D. 213,163 | 1/1969 | Stone . | |
| D. 214,477 | 6/1969 | Pawsat et al. . | |
| D. 216,856 | 3/1970 | Black . | |
| D. 223,072 | 3/1972 | Pawsat et al. . | |
| 623,379 | 5/1898 | Nefzger . | |
| 1,398,447 | 11/1921 | Smith . | |
| 1,738,855 | 12/1929 | Thompson | 74/551.1 |
| 2,059,669 | 11/1936 | Skoog | 74/551.1 |
| 2,133,010 | 10/1938 | Barry . | |
| 3,529,490 | 9/1970 | Pawsat et al. . | |
| 3,530,738 | 9/1970 | Kerr . | |

OTHER PUBLICATIONS

Fifty Years of Schwinn-Built Bicycles, p. 13.
*American Bicyclist and Motorcyclist,* "The High-Rising 60s", vol. 100, No. 12, Dec. 1979, p. 259.
*Bicycles and Dirt,* Aug., pp. 16, 36 and two unnumbered pages.
*BMX Action Magazine,* excerpt from Aug. 1983.
Article entitled "The Story of the Bicycle", J. Woodforde, p. 30.
"A Social History of the Bicycle", R. A. Smith, various pages.
"The Bicycle", A Guide and Manual, R. J. Way, two pages.
Wald Catalog, "Bicycle Handlebars", pp. 20–21.
*BMX Action Magazine,* excerpt from Jul. 1983, one page.
*Bicycles and Dirt Magazine,* Jul. p. 22.
*Bicycles and Dirt Magazine,* Jul. 1983, one page.
*Bicycles and Dirt Magazine,* Aug. 1983, one page.
One page entitled "Bicycle for One Person (1869)".

*Primary Examiner*—Henry Bennett
*Attorney, Agent, or Firm*—Wood, Herron & Evans

[57] ABSTRACT

A brace connected between the arms of a bicycle handlebar includes spaced, longitudinally extending legs formed in a U-shaped cross section having an open interior. The barce is bent inwardly at each end forming end portions of reduced cross section which are each contoured to mount to a handlebar arm by welding or brazing. By providing an open interior along the length of the brace, cleaning or plating solutions applied after welding are drained away so that they cannot later seep out onto the final paint or chrome coating of the handlebar and ruin the finish.

5 Claims, 3 Drawing Figures

BICYCLE HANDLEBAR BRACE

BACKGROUND OF THE INVENTION

This invention relates to bicycles, and, more particularly, to a support brace connected between the arms of the handlebar of a bicycle.

Bicycle handlebars include a transverse bar adapted for mounting to the front fork of a bicycle, and integral, spaced bicycle arms each having gripping handle. The spaced arms of some handlebars are elongated to increase the overall length of the handlebar, and, in other handlebars, the arms are spaced relatively far apart at divergent angles from the transverse bar. Both of these handlebar designs may require a support brace connected between the handlebar arms to provide the necessary stiffness and avoid bending of the handlebar arms.

Handlebar support braces are usually formed of steel tubing extending betwen the handlebar arms and welded or brazed thereto. The tubing is first cut to the correct length and then its ends are shaped to conform to the contour of the handlebar arms in preparation for welding. The steel tubing forming the handlebar brace may be circular in cross section along its entire length, or, alternatively, the steel tubing may have a circular cross section formed with flattened end portions adapted to mount to the handlebar arms.

One major problem with many prior art handlebar braces, including both those with a continuous circular cross section and those having flattened ends, is that they have a closed interior without any drain openings. Once the ends of the handlebar braces are welded to the handlebar arms, cleaning or plating solutions are applied to the brace prior to the application of a chrome or painted finish coating. If the brazing or welding failed to completely close the connection between the end of the handlebar braces and arms, the cleaning or plating solutions enter the closed interior of the handlebar brace and cannot drain out of the brace except through the weldment. After the finish coating or painting of the handlebar is applied, the solutions often seep back out the voids in the weldment which ruins the appearance of the handlebar.

One solution to this problem has been to perforate the handlebar brace at either end to allow the cleaning or plating solutions to enter the interior of the brace and drain back out prior to finish coating of the handlebar. This method does not completely eliminate the problem because some solution is usually retained in the interior of the brace and subsequently leaks from the drain holes to discolor the brace in the vicinity of the drain holes.

SUMMARY OF THE INVENTION

It is therefore among the objects of this invention to provide a handlebar brace which is adapted for connection between the arms of a handlebar, which does not allow cleaning or plating solutions to collect therein, which retains the appearance of braces having a circular cross section and which provides sufficient strength for supporting the handlebar arms.

These objects are accomplished in a bicycle handlebar brace according to this invention which is adapted to mount between the spaced arms and above the transverse bar of a bicycle handlebar. The brace includes an elongated center portion having a constant, channel-shaped cross section which is bent inwardly at the ends forming opposed end portions of reduced cross section. The end portions are shaped to conform to the contour of the handlebar arms and are welded or brazed thereto for mounting the handlebar brace in place.

The handlebar brace of this invention is formed in a single progressive die from an elongated flat bar of steel. The edges of the flat bar are bent or channeled upwardly in a progressive die forming spaced legs on one side of the bar and a continuous surface on the opposite side. In one presently preferred embodiment, the space between the legs is wider at the center portion than at the end portions. The space between the legs along the length of the brace, including the end portions welded to the handlebar arms, defines an open interior which allows cleaning or plating solutions to completely drain. Unlike prior art braces, the handlebar brace of the invention prevents the collection of solutions even along the bent end portions or weldments and allows the finish coating of paint or chrome to be applied without subsequent leakage of solution.

In one presently preferred embodiment of this invention, the brace is formed in a U-shaped cross section with the end portions being bent inwardly and having a smaller cross section than the center portion. It is contemplated, however, that the brace could be formed in other configurations such as V-shaped, semi-circular or other cross sections having an open interior. In addition, the brace could be formed as a straight section or with a bend at the center forming a V-shaped brace.

The brace is preferably mounted to the handlebar arms such that its continuous surfaces faces the rider and the opposite side faces downwardly. A brace having a U-shaped cross section, for example, is mounted to the handlebar arm such that its spaced legs and open interior face downwardly toward the transverse bar, and its continuous, rounded surface faced upwardly and appears circular to the rider. Therefore, the brace of this invention is not only aesthetically acceptable, but provides sufficient stiffening of the handlebar arms without collecting cleaning or plating solutions which could ruin the finished appearance of the handlebar.

DESCRIPTION OF THE DRAWINGS

The structure, operation and advantages of this invention will become further apparent upon consideration of the following description taken in conjunction with the accompanying drawings, wherein.

DETAILED DESCRIPTION OF THE INVENTION

Figure 3:
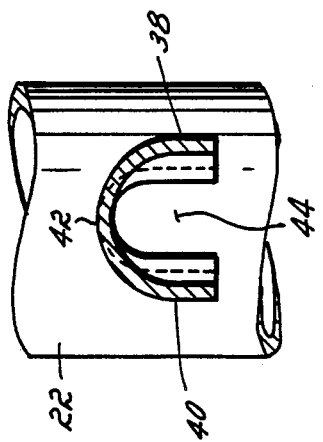
FIG. 3 is a view in partial cross section taken generally along line 3—3 of FIG. 2 showing the connection of the brace herein to a handlebar arm.

Referring now to the drawings, a handlebar 10 is shown mounted to the front fork 12 of a bicycle 14. The handlebar 10 includes a transverse bar 16 formed with a knurled section 18 connected to a handlebar stem (not shown) for mounting to the front fork 12. A pair of handlebar arms 20, 22 are bent upwardly at divergent angles from the ends of transverse bar 16. Each of the arms 20, 22 is formed with an integral handle 24, 26, respectively.

Figure 2:
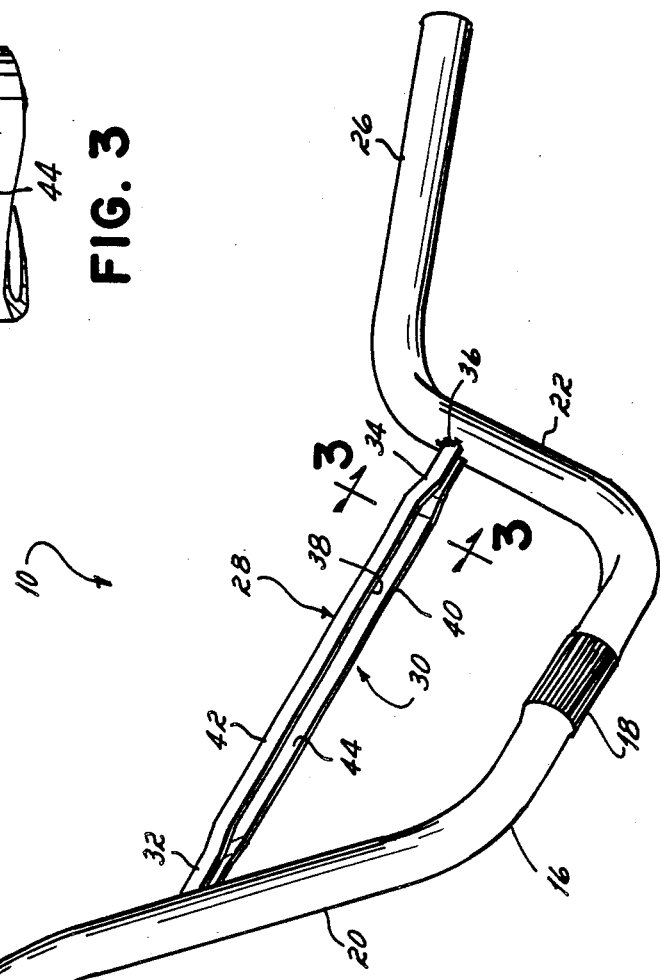
FIG. 2 is a perspective view looking upwardly at a handlebar incorporating the brace of this invention.
Figure 1:
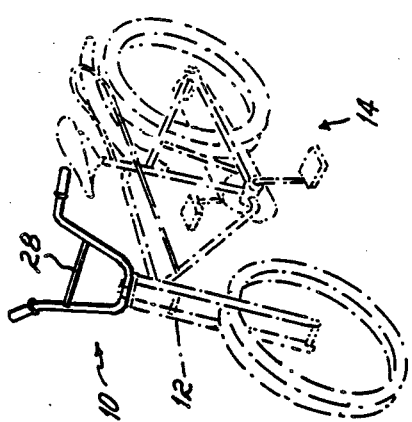
FIG. 1 is a perspective view of a handlebar incorporating the brace of this invention positioned on the front fork of a bicycle shown in phantom.

In order to prevent bending of the handlebar arms 20, 22 with respect to the transverse bar 16, a handlebar brace 28 according to this invention is connected therebetween. As shown in FIGS. 2 and 3, the brace 28 is formed with a U-shaped cross section having center portion 30 which tapers inwardly at either end forming end portions 32 and 34. The end portions 32, 34 have a smaller cross section than that of center portion 30 and are contoured to permit mounting of the end portions 32, 34 to the handlebar arms 20, 22 by brazing or welding as illustrated by the weldment 36 between end portion 34 and arm 22.

The brace 28 of this invention is formed from a section of steel flat stock in a single progressive die in which the longitudinal edges of the stock are bent inwardly forming spaced, longitudinally extending upright legs 38, 40 and a continuous arcuate surface 42 therebetween. The legs 38, 40 are bent inwardly, toward one another, at each of the end portions 32, 34 to reduce the overall cross section thereat. The space between the legs 38, 40 of brace 28 defines an open interior 44 along its entire length whose cross section is constant along the center portion 30 and reduced at each of the end portions 32, 34.

Prior to mounting the brace 28 to handlebar 10, its end portions 32, 34 are first shaped to conform to the contour of handlebar arms 20, 22, as shown at FIG. 3, and the brace 28 is then cut to the proper length. The brace 28 is then brazed or welded to the handlebar arms 20, 22, as at weldment 36, so that its open interior 44 faces the transverse bar 16 and its continuous surface 42 faces upwardly as viewed by one riding the bicycle 14.

In a presently preferred embodiment of this invention, the cross section of the center portion 30 and end portions 32, 34 is generally U-shaped. It is contemplated, however, that the brace 28 could be formed with a V-shaped cross section, a semi-circular shaped cross section or any other three-sided channel-shaped cross section having an open interior. In this manner, cleaning or plating solutions applied to the brace 28 and arms 20, 22 at the weldment 36 cannot collect within the brace 28 and later damage the finish of the handlebar 10 but are immediately drained away. In addition, the brace 28 is illustrated in the drawings as being straight and generally parallel to the transverse bar 16. However, it is contemplated that the brace could be V-shaped, with the bend in the V facing either upwardly or downwardly with respect to the transverse bar 16.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, in some applications the brace 28 may be formed with a center portion 30 and end portions 32, 34 having the same sized cross section so long as sufficient stiffness is provided to support the handlebar arms 20, 22. Therefore, it is intended that the invention not be limited to the particular embodiment disclosed as the best mode contemplated for carrying out this invention, but that the invention will include all embodiments falling within the scope of the appended claims.

I claim:

1. In a bicycle handlebar having spaced handlebar arms connected to a transverse bar, the improvement comprising:
   a brace having a center portion disposed between opposed end portions, each of said end portions being fixedly secured by weldment means to a handlebar arm;
   said center portion and said end portions each having spaced, longitudinally extending legs forming a channel-shaped cross section having an open interior forcing vertically downwardly when said handlebar is mounted upon a bicycle.

2. The brace of claim 1 in which said center portion extends along a major portion of the length of said brace.

3. The brace of claim 1 in which said channel-shaped cross section is generally U-shaped having an arcuate surface connected between said spaced, longitudinally extending legs.

4. The brace of claim 1 in which said spaced longitudinally extending legs of said end portions are bent inwardly toward one another and contoured for mounting to a handlebar arm.

5. The brace of claim 4 in which said channel-shaped cross section of said end portions is smaller than said channel-shaped cross section of said center portion.

* * * * *

UNITED STATES PATENT AND TRADEMARK OFFICE
CERTIFICATE OF CORRECTION

PATENT NO. :   4,635,499

DATED      :   January 13, 1987

INVENTOR(S) :  David K. McMurtrey

It is certified that error appears in the above-identified patent and that said Letters Patent is hereby corrected as shown below:

Column 4, line 32, change "forcing" to --facing--.

Signed and Sealed this

Eighteenth Day of August, 1987

*Attest:*

DONALD J. QUIGG

*Attesting Officer*   Commissioner of Patents and Trademarks